US012709074B2

(12) United States Patent
Baviloliaie et al.

(10) Patent No.: US 12,709,074 B2
(45) Date of Patent: Aug. 18, 2026

(54) MANUFACTURING OF WIND TURBINE BLADE SPAR CAP

(71) Applicant: LM WIND POWER A/S, Kolding (DK)

(72) Inventors: Mahdi Baviloliaie, Kolding (DK); Rama Razeghi, Eastleigh (GB); Michael Koefoed, Kolding (DK); Harry Alkemade, DH Heerhugowaard (NL); Manoj Ramdas Kharate, Nelamangala Taluk (IN); Kiran Manikarnika, Kolding (DK)

(73) Assignee: LM Wind Power A/S, Kolding (DK)

( * ) Notice: Subject to any disclaimer, the term of this patent is extended or adjusted under 35 U.S.C. 154(b) by 95 days.

(21) Appl. No.: 18/720,878

(22) PCT Filed: Jan. 13, 2023

(86) PCT No.: PCT/EP2023/050745

§ 371 (c)(1),
(2) Date: Jun. 17, 2024

(87) PCT Pub. No.: WO2023/135256

PCT Pub. Date: Jul. 20, 2023

(65) Prior Publication Data

US 2025/0050597 A1 Feb. 13, 2025

(30) Foreign Application Priority Data

Jan. 17, 2022 (EP) .................................... 22151821

(51) Int. Cl.
*B29C 70/52* (2006.01)
*B29C 65/00* (2006.01)
(Continued)

(52) U.S. Cl.
CPC .......... *B29C 70/443* (2013.01); *B29C 66/721* (2013.01); *B29C 70/52* (2013.01); *B29L 2031/085* (2013.01)

(58) Field of Classification Search
CPC ................................ B29C 70/52; B29C 70/00
See application file for complete search history.

(56) References Cited

U.S. PATENT DOCUMENTS

2011/0104471 A1* 5/2011 Weisberg ................ B29C 70/32
156/185
2011/0135485 A1* 6/2011 Wang .................... B29C 70/521
29/889.71

(Continued)

FOREIGN PATENT DOCUMENTS

EP 3501808 A1 6/2019
WO 2016015736 A1 2/2016

*Primary Examiner* — Andrew D Graham
(74) *Attorney, Agent, or Firm* — Dority & Manning P.A.

(57) ABSTRACT

The present invention relates to a method of manufacturing a fibre-reinforced spar cap (45) for a wind turbine blade. A plurality of pultruded fibre plates (70) is arranged in a spar cap mould (62) to form a stacked arrangement (69) of pultruded fibre plates (70). An insert member (86) is arranged next to a lateral surface (67) of the stacked arrangement (69), wherein the first insert member (86) comprises a connecting surface (87), and wherein the first insert member (86) is arranged such that its connecting surface abuts against the first lateral surface (67) of the stacked arrangement (69). Resin is infused into the stacked arrangement (69) and the insert member (86) to form the fibre-reinforced spar cap (45) or a preform thereof, which can be trimmed to the required size.

18 Claims, 6 Drawing Sheets

(51) Int. Cl.
*B29C 70/44* (2006.01)
*B29L 31/08* (2006.01)

(56) References Cited

U.S. PATENT DOCUMENTS

| | | | | |
|---|---|---|---|---|
| 2014/0301859 | A1* | 10/2014 | Hancock | B29C 70/84 156/60 |
| 2015/0224721 | A1 | 8/2015 | Bendel et al. | |
| 2015/0226178 | A1* | 8/2015 | Randall | B29C 70/68 156/60 |
| 2015/0316027 | A1* | 11/2015 | Sandercock | F03D 1/0675 29/889.71 |
| 2016/0146184 | A1* | 5/2016 | Caruso | F03D 1/0675 156/60 |
| 2016/0146185 | A1* | 5/2016 | Yarbrough | B32B 5/22 156/242 |
| 2016/0160837 | A1* | 6/2016 | Geiger | B29D 99/0028 29/889.71 |
| 2016/0263775 | A1* | 9/2016 | Boon | F03D 1/0675 |
| 2016/0305399 | A1* | 10/2016 | Spandley | B29D 99/0028 |
| 2016/0319801 | A1* | 11/2016 | Smith | F03D 1/0675 |
| 2017/0022825 | A1* | 1/2017 | Caruso | B29C 65/34 |
| 2017/0022968 | A1* | 1/2017 | Caruso | F03D 1/065 |
| 2017/0122287 | A1* | 5/2017 | Dobbe | F03D 1/0675 |
| 2018/0186103 | A1* | 7/2018 | Hunter | B29C 70/342 |
| 2018/0372065 | A1* | 12/2018 | Livingston | B29C 70/48 |
| 2018/0372066 | A1* | 12/2018 | Livingston | F03D 1/0675 |
| 2019/0120203 | A1* | 4/2019 | Albert | B32B 21/047 |
| 2019/0270261 | A1* | 9/2019 | Randall | B29C 70/342 |
| 2019/0353143 | A1* | 11/2019 | Girolamo | B29D 99/0028 |
| 2020/0300216 | A1 | 9/2020 | Girolamo et al. | |
| 2021/0332789 | A1* | 10/2021 | Aldinger | F03D 13/10 |

* cited by examiner 90
45
66
64
Ls
67
Ws
68
62
63
61
90
64
66
62
90
69
70
70
67
68
64
66
62
90
86
70
69
89
88
64
66
62
87
86
70
69
45
88
86
70
69
45
88
84a
84b
84c
84d 45
82a
82b
70
82
82
Hs
Ws 86
67
70
72
69
74
68
78
76
78
62
87

86
67
70
72
80
69
74
68
78
76
78
62
87

MANUFACTURING OF WIND TURBINE BLADE SPAR CAP

This is a National Phase Application filed under 35 U.S.C. 371 as a national stage of PCT/EP2023/050745, filed Jan. 13, 2023, an application claiming the benefit of European Application No. 22151821.0, filed Jan. 17, 2022, the content of which is hereby incorporated by reference in its entirety.

FIELD OF THE INVENTION

The present invention relates to a method of manufacturing a fibre-reinforced spar cap for a wind turbine blade, to a method of manufacturing a wind turbine blade, and to a fibre-reinforced spar cap for a wind turbine blade.

BACKGROUND OF THE INVENTION

In view of climate change and an increasingly unsustainable fossil fuel use, wind proves to be a cost-effective, clean and renewable source of energy. Wind turbines usually comprise a tower, generator, gearbox, nacelle, and one or more rotor blades. Wind turbine blades capture kinetic energy of wind using known airfoil principles. Modern wind turbines may have rotor blades that exceed 100 meters in length.

Wind turbine blades are usually manufactured by forming two shell parts or shell halves from layers of woven fabric or fibre and resin. Spar caps, which are also called main laminates, are placed or integrated in the shell halves and may be combined with shear webs or spar beams to form structural support members. Spar caps or main laminates may be joined to, or integrated within, the inside of the suction side and pressure side halves of the shell.

As the size of wind turbine blades increases, various challenges arise from such blades being subjected to increased forces during operation, requiring improved reinforcing structures. In some known solutions, pultruded fibrous strips of material are used. Pultrusion is a continuous process in which fibres are pulled through a supply of liquid resin and then heated in an open chamber where the resin is cured. Such pultruded strips can be cut to any desired length.

However, the manufacturing of large reinforcing structures, such as spar caps, can be challenging. In particular, many limitations still exist in the ability to stay within required tolerances during known processes for manufacturing spar caps. Also, some known spar cap moulding methods are quite tedious and ineffective, and may result in undesired damage to the pultruded elements when demoulding the spar cap from the spar cap mould. Other potential problems include wrinkle formation, unsatisfactory resin impregnation or air pockets formed during known moulding processes for forming spar caps.

In addition, when using two or more different types of materials for spar cap formation, such as pultruded carbon plates and a separate interlayer material, it may become challenging to match the resin flow fronts at the top and bottom of the spar cap layup because the various materials may have different permeabilities. This may lead to insufficient resin impregnation of parts of the spar cap arrangement, such as dry interlayer regions or locked off fibre regions with no or insufficient wetting by resin.

Furthermore, gap formation between the spar cap layup and the spar cap mould presents a challenge, which potentially may result in resin pools, geometry control and/or problems with demoulding.

It is therefore an object of the present invention to provide an improved method of manufacturing a spar cap for a wind turbine blade, which is more efficient and less time-consuming.

It is another object of the present invention to provide an improved method of manufacturing a spar cap for a wind turbine blade, which leads to an improved spar cap structure, in particular with respect to resin impregnation and the avoidance of dry regions.

It is another object of the present invention to provide an improved method of manufacturing a spar cap for a wind turbine blade that minimises wrinkle formation, unsatisfactory resin impregnation or air pockets formed during the manufacturing process.

SUMMARY OF THE INVENTION

It has been found that one or more of the aforementioned objects can be obtained by a method of manufacturing a fibre-reinforced spar cap for a wind turbine blade, the method comprising the steps of:

- providing a spar cap mould,
- arranging a plurality of pultruded fibre plates in the spar cap mould to form a stacked arrangement of pultruded fibre plates, wherein the stacked arrangement comprises a first lateral surface and an opposing second lateral surface,
- arranging a first insert member next to the first lateral surface of the stacked arrangement wherein the first insert member comprises a connecting surface, and wherein the first insert member is arranged such that its connecting surface abuts against the first lateral surface of the stacked arrangement,
- optionally arranging a second insert member next to the second lateral surface of the stacked arrangement wherein the second insert member comprises a connecting surface, and wherein the second insert member is arranged such that its connecting surface abuts against the second lateral surface of the stacked arrangement,
- placing a vacuum foil over the stacked arrangement and the first insert member and the optional second insert member,
- infusing resin into the stacked arrangement and the first insert member and the optional second insert member,
- curing the resin to join the stacked arrangement and the first insert member and the optional second insert member to form the fibre-reinforced spar cap or a preform thereof,
- removing the vacuum foil, and
- demoulding the fibre-reinforced spar cap or the preform thereof from the spar cap mould,
- optionally trimming or grinding at least part of the first insert member and/or at least part of the second insert member of the preform to form the fibre-reinforced spar cap.

It has been found that this method leads to an effective minimization of cracks and holes around the edges/corners of the final spar cap, thus minimizing the need for repairs and also limiting the risk of structural weakness within the spar cap. Also, a more even distribution of resin within the final spar cap can be achieved, avoiding dry regions with insufficient resin impregnation.

The spar cap mould typically has an upper surface including a moulding surface. The moulding surface can be substantially flat, or it can be at least partially curved. Usually, the spar cap mould will extend along a longitudinal direction, with a length of at least 20 meters, such as at least 35 meters. The spar cap mould may be made of or comprise a composite material and/or may comprise a metal material.

In some embodiment, first and second guide members can be fastened to the moulding surface, preferably releasably fastened, for providing a moulding cavity in between the first and second guide members. The first guide member may extend in the longitudinal direction of the mould closer to a first edge of the mould, and the second guide member may extend in the longitudinal direction of the mould closer to the second edge of the mould. It is preferred that the first and second guide members extend along the longitudinal direction of the mould, substantially parallel to each other. For example, the first guide member may extend along a first lateral edge of the spar cap, the first lateral edge of the spar cap facing the trailing edge of the blade when arranged in the blade shell, and the second guide member may extend along a second lateral edge of the spar cap, the second lateral edge of the spar cap facing the leading edge of the blade when arranged in the blade shell. In a preferred embodiment, the first guide member and the second guide member are guide rails.

In a preferred embodiment, each guide member comprises an upstand, such as an upright structure or substantially vertically extending structure, forming the longitudinally extending guide surface. In a preferred embodiment, each of the guide members has a substantially L-shaped cross section, or a skewed or compressed L-shaped cross section. In another preferred embodiment, the guide members have a triangular cross section. In other embodiments, the guide members have a prism cross section. It is preferred that each guide member has substantially horizontal section, which can be fastened to the mould, and a substantially vertical section extending from the mould in a substantially vertical or upward direction. In other embodiments, each of the guide members has a triangular cross section.

In a preferred embodiment, the first and second guide members extend along the longitudinal direction of the mould, preferably substantially parallel to the lateral edges of the mould. Thus, it is preferred that the first and second guide members extend along substantially the entire length of the mould, and preferably along substantially the entire length of the spar cap. In a preferred embodiment, the first and second guide members are bolted to the mould. Thus, one or more bolts can be inserted into each guide member, preferably extending into receiving holes in the mould. In other embodiments, the guide members can be fastened to the mould by one or more screws, adhesives, snap connections, or other fastening means.

In a preferred embodiment, the transverse distance between the first and second guide members is at least 1 metre, such as at least 5 metres or at least 8 meters. Usually, the transverse distance between the two guide members at the moulding surface should accommodate more than the width of the spar cap to be manufactured, such as at least an additional 5% or an additional 10% as compared to the width of the spar cap or fibre material arranged in between the guide members.

A plurality of pultruded fibre plates are arranged in the spar cap mould to form a stacked arrangement of pultruded fibre plates. In a preferred embodiment, the stacked arrangement is formed from adjacent stacks of pultruded fibre plates, e.g. 3-10 adjacent stacks of plates, each stack having preferably 2-20 plates stacked on top of each other. Normally, the stacks are arranged adjacent to each other in a substantially chordwise direction, i.e. wherein the first stack is closest to the trailing edge of the later blade, when going from left to right in a chordwise direction.

The pultruded fibre plates typically comprise a fibre material, such as glass or carbon fibre material, typically in the form of a plurality of tows of fibre material, usually bonded together by a resin or binding agent in the pultrusion process. In a preferred embodiment, the fibre material comprises a plurality of plates of fibre material arranged into adjacent stacks of plates. Each stack of plates may comprise 2-30, such as 3-20 plates, e.g. plates of pultruded fibre material, successively arranged on top of each other. Thus, each stack will usually extend in a longitudinal/spanwise direction of the spar cap. In a preferred embodiment, the plates comprise pultruded fibre plates, preferably pultruded fibre plates comprising a fibre material, preferably carbon fibres.

The stacked arrangement comprises a first lateral surface and an opposing second lateral surface. In the later wind turbine blade, the first and second lateral surfaces of the stacked arrangement will typically face towards the trailing edge and towards the leading edge, respectively. Usually, the stacked arrangement will have a substantially rectangular cross section as seen in a plane defined by the chordwise direction and the flapwise direction. Typically, the stacked arrangement placed in the spar cap mould prior to resin infusion, has a longitudinally extending top surface and an opposing longitudinally extending bottom surface, and first and second longitudinally extending lateral surfaces. When the spar cap is installed in the blade, the longitudinal direction of the stacked arrangement typically extends in a substantially spanwise direction of the blade.

The distance between the top and bottom surface usually defines the thickness of the stacked arrangement or of the later spar cap. The top and bottom surfaces of the stacked arrangement are typically vertically separated, whereas the first and the second lateral surfaces are transversely or horizontally separated. The stacked arrangement can have the shape of a rectangular plate or a slab. The spar cap usually has a rectangular shaped cross-section when sectioned normally to the longitudinal or spanwise extension.

A first insert member is arranged next to the first lateral surface of the stacked arrangement, for example the lateral surface which faces towards the trailing edge in the later blade, wherein the first insert member comprises a connecting surface. In a preferred embodiment, the connecting surface is substantially flat. In a preferred embodiment, the first insert member is cuboid shaped. Thus, the first insert member may have a rectangular cross section. In another preferred embodiment, the first insert member and/or the second insert member are substantially wedge-shaped. Thus, the first insert may have a triangular cross section. The connecting surface may be a side surface or lateral surface of the cuboid-shaped or wedge-shaped insert member.

A wedge-shaped insert typically has a substantially triangular cross section, when sectioned normally to the longitudinal or spanwise extension. Preferably, the wedge-shaped insert is arranged such that a side is arranged substantially flush with the upper surface of the stacked arrangement. Preferably, when arranged in the spar cap mould, the profile of the wedge-shaped insert tapers from the upper surface of the stacked arrangement towards the bottom surface of the stacked arrangement. In other words, the width of the insert member may taper from its upper surface towards its bottom surface. This has been found to facilitate demoulding of the fibre-reinforced spar cap or a preform thereof, after the resin curing step.

In a preferred embodiment, the first insert member has a height of 20-100 mm and a width of 50-150 mm. Preferably, the height of the first insert member corresponds substantially to the height of the stacked arrangement.

The first insert member is arranged such that its connecting surface abuts against the first lateral surface of the stacked arrangement. In some embodiments, the first insert member is pressed against the lateral surface of the stacked arrangement of pultruded fibre plates. In some embodiments, the each insert member may have a length of at least 25 meters, such as at least 50 meters or at least 70 meters.

In some embodiments, a second insert member is arranged next to the second lateral surface of the stacked arrangement, for example the lateral surface which faces towards the leading edge in the later blade, wherein the second insert member comprises a connecting surface, and wherein the second insert member is arranged such that its connecting surface abuts against the second lateral surface of the stacked arrangement. Preferably, the second insert member has the same shape as the first insert member.

In a preferred embodiment, the connecting surface of the second insert member is substantially flat. In a preferred embodiment, the first insert member and the second insert member are substantially wedge-shaped. The connecting surface of the second insert member may be a side surface or lateral surface of the wedge-shaped insert member. The second insert member has a height of 20-100 mm and a width of 50-150 mm. Preferably, the height of the first insert member corresponds substantially to the height of the stacked arrangement.

In some embodiments, the stacked arrangement of pultruded fibre plates is arranged within the moulding cavity, in between and along the first and second guide members, such that a first gap is provided between the stacked arrangement and the first guide member, and a second gap is provided between the stacked arrangement and second guide member. It is preferred that the respective gaps increase in width when moving from the moulding surface in an upward direction. Thus, the respective gaps may be substantially V-shaped or substantially wedge-shaped. In some embodiments, the transverse/horizontal distance between the fibre material and the respective guide member is between 1 and 100 mm, preferably between 1 and 50 mm, at the moulding surface. The transverse distance between the fibre material and the respective guide member preferably increases when moving upwardly from the moulding surface. At the top surface of the fibre material, the transverse distance between the fibre material and the respective guide member is preferably between 10 and 1000 mm, such as between 20 and 500 mm.

In a preferred embodiment, the first guide member comprises a longitudinally extending guide surface, and the second guide member comprises a longitudinally extending guide surface facing the guide surface of the first guide member, the guide surface of the first guide member diverging from the guide surface of the second guide member in an upward direction. It is thus preferred that the respective guide surfaces together form a funnel shape towards the moulding surface. In other words, the guide surface of the first guide member may diverge from the guide surface of the second guide member in an upward direction, the planes in which the respective guide surfaces lie forming an angle. Said angle is preferably not larger than 90°, more preferably not larger than 45°.

A vacuum foil/bag is placed over the stacked arrangement and the first insert member and the second insert member, if a second insert member is used. If no second insert member is used, the vacuum foil is placed over the stacked arrangement and the first insert member. The vacuum foil/bag may be any vacuum-tight film. Lateral sealing of the moulding cavity can be ensured by applying an adhesive film or roll at the side of the mould, such as tacky tape.

Resin is then infused into the stacked arrangement and the first insert member and the optional second insert member. In a preferred embodiment, resin is infused such that the resin flow direction is from the second lateral surface towards that first lateral surface of the stacked arrangement. Thus, resin is preferably infused from the second lateral surface which faces the leading edge in the later blade towards the first lateral surface of the stacked arrangement which faces the trailing edge in the later blade.

Resin, for example an epoxy resin, is preferably infused into the stacked arrangement and the insert member(s) to form a fibre-reinforced polymer, followed by curing the resin-infused fibre material to form the fibre-reinforced spar cap, and removing the first and second inserts and the vacuum foil. The resin infusion is step is preferably performed by Vacuum Assisted Resin Transfer Moulding (VARTM), wherein the vacuum foil or vacuum bag is arranged on top of the fibre material, sealing against the mould, thereby forming a mould cavity containing the fibre material of the spar cap. Resin inlets and vacuum outlets can be connected to the mould cavity. Typically, the mould cavity is evacuated via the vacuum outlets so as to form negative pressure in the mould cavity. The resin can thus be forced into the mould cavity due to the pressure differential and impregnates the fibre material of the later spar cap.

The resin is cured to join the stacked arrangement and the first insert member and the optional second insert member to form the fibre-reinforced spar cap or a preform thereof. The term preform of the fibre-reinforced spar cap identifies an element which is formed into the final spar cap by an additional operation, typically a trimming, cutting or grinding operation to remove part or all of the first insert.

The fibre-reinforced spar cap or the preform thereof can be demoulded from the spar cap mould. In some embodiments, the fibre-reinforced spar cap is then formed by trimming or grinding at least part of the first insert member and/or at least part of the second insert member of the preform.

Thus, in a particularly preferred embodiment, the present invention relates to a method of manufacturing a fibre-reinforced spar cap for a wind turbine blade, the method comprising the steps of providing a spar cap mould, arranging a plurality of pultruded fibre plates in the spar cap mould to form a stacked arrangement of pultruded fibre plates, wherein the stacked arrangement comprises a first lateral surface and an opposing second lateral surface, arranging a first insert member next to the first lateral surface of the stacked arrangement wherein the first insert member comprises a connecting surface, and wherein the first insert member is arranged such that its connecting surface abuts against the first lateral surface of the stacked arrangement, optionally arranging a second insert member next to the second lateral surface of the stacked arrangement wherein the second insert member comprises a connecting surface, and wherein the second insert member is arranged such that its connecting surface abuts against the second lateral surface of the stacked arrangement, placing a vacuum foil over the stacked arrangement and the first insert member and the optional second insert member, infusing resin into the stacked arrangement and the first insert member and the optional second insert member, curing the resin to join the stacked arrangement and the first insert member and the optional second insert member to form a preform of the fibre-reinforced spar cap, removing the vacuum foil, demoulding the preform from the spar cap mould, and trimming or grinding at least part of the first insert member and/or at least part of the second insert member of the preform to form the fibre-reinforced spar cap.

This allows for a particularly efficient way of reducing the occurrence of cracks and cavities in the final spar cap, in particular when trimming the first and/or second insert member such that dry regions with insufficient resin impregnation are removed from the fibre-reinforced spar cap.

It is preferred that at least the first insert member of the preform is trimmed after demoulding the preform from the spar cap mould. Preferably, at least the first insert member is trimmed to have a desired width. In some embodiments, each of the first insert member and the second insert member are trimmed to have a desired width. The trimming operation may be carried out by a trimming apparatus such as a saw device or a cutting device.

In a particularly preferred embodiment, only a cuboid-shaped first insert member is used, at least part of which is removed, e.g. by trimming, cutting or grinding, after resin curing to provide the final spar cap. In such embodiment, it is preferred that no second insert member is used.

In a preferred embodiment, the insert has the same height, or vertical extent, as the stacked arrangement of pultruded fibre plates. Advantageously, the first insert member and/or the second insert member can be made of a swellable material. In a preferred embodiment, the first insert member and/or the second insert member comprise balsa wood, a foam material or honeycomb. In a particularly preferred embodiment, the first insert member and/or the second insert member are made of a foam material, preferably polyethylene terephthalate (PET) foam.

In other embodiments, the first insert member and/or the second insert member comprise a fabric, preferably a fibrous fabric such as a glass or a carbon fibre fabric, or mixtures thereof. In some embodiment, the first and/or second insert member may comprise one or more fibre mats. In some embodiments, the first insert member and/or the second insert member consists of a fabric, preferably a fibre fabric, such as one or more fibre mats.

In some embodiments, an interlayer is disposed between adjacent pultruded fibre plates in the stacked arrangement of pultruded fibre plates. It is particularly preferred that the interlayer is arranged horizontally, i.e. substantially perpendicularly to the lateral surfaces, in between each adjacent layer of plates. In some embodiment, the interlayer has the same width, or transverse/horizontal extent, as the stacked arrangement.

It is preferred that each pultruded fibre plate is formed of a pultrusion fibre material comprising glass fibres and/or carbon fibres, and a resin or binding agent. In a preferred embodiment, the pultruded fibre plates are arranged into adjacent stacks of pultruded fibre plates.

In a preferred embodiment, the method comprises fastening a first guide member (64) and a second guide member (66) to the mould for providing a moulding cavity (68) in between the first and second guide members. This can be achieved, for example, by using respective bolts to fasten the guide member to the spar cap mould.

In another aspect, the present invention relates to a fibre-reinforced spar cap obtainable by the above-described method of the present invention.

In another aspect, the present invention relates to a method of manufacturing a wind turbine blade, the method comprising the steps of:

manufacturing a fibre-reinforced spar cap using the method of the present invention, providing a wind turbine shell part with an outer aerodynamic surface and an opposing inner surface, arranging the fibre-reinforced spar cap on the inner surface of the shell part, and bonding the fibre-reinforced spar cap to the inner surface of the shell part.

Typically, the wind turbine shell part is a shell half. The wind turbine blade usually has a pressure side and a suction side, and a leading edge and a trailing edge with a chord having a chord length extending therebetween, the wind turbine blade extending in a spanwise direction between a root end and a tip end. Usually, one or more spar caps can be installed in the pressure side shell half and in the suction side shell half of the blade, and a flapwise extending shear web can be arranged in between the opposing spar caps of the two shell halves. Usually, the pressure side shell half and the suction side shell half are manufactured over the entire length of the wind turbine blade, i.e. over their entire final length. The pressure side shell half and the suction side shell half will typically be adhered or bonded to each other near the leading edge and near the trailing edge. Each shell half may comprise longitudinally/spanwise extending spar caps, also called main laminates, preferably comprising reinforcement fibres such as glass fibres, carbon fibres, aramid fibres, metallic fibres, such as steel fibres, or plant fibres, or mixtures thereof. The shell halves will typically be produced by infusing a fibre lay-up of fibre material with a resin such as epoxy, polyester or vinyl ester. The spar caps or main laminates are usually affixed to the inner faces of the shell halves.

In another aspect, the present invention relates to a fibre-reinforced spar cap for a wind turbine blade, the spar cap comprising a plurality of pultruded fibre plates formed into a stacked arrangement of pultruded fibre plates, wherein the stacked arrangement comprises a first lateral surface and an opposing second lateral surface, a first insert member arranged next to the first lateral surface of the stacked arrangement wherein the first insert member comprises a connecting surface, and wherein the first insert member is arranged such that its connecting surface abuts against the first lateral surface of the stacked arrangement, optionally a second insert member arranged next to the second lateral surface of the stacked arrangement wherein the second insert member comprises a connecting surface, and wherein the second insert member is arranged such that its connecting surface abuts against the second lateral surface of the stacked arrangement, wherein the first insert member, and optionally the second insert member, are bonded to the stacked arrangement of pultruded fibre plates by a cured resin.

In a particularly preferred embodiment, the first insert member and/or the second insert member is a ground or trimmed insert. In a particularly preferred embodiment, the first insert member and/or the second insert member is a trimmed insert. Advantageously, any dry regions with insufficient resin impregnation are removed from the insert member by said trimming or grinding operation. Thus, it is preferred that the first insert member and/or the second insert member of the fibre-reinforced spar cap is obtained by a grinding operation or a trimming operation, preferably by a grinding operation or a trimming operation carried out after bonding the first insert member and/or the second insert member to the stacked arrangement of pultruded fibre plates by the resin.

Preferably, the spar cap comprises both a first insert member and a second insert member as defined above. In a preferred embodiment, the first insert member and/or the second insert member are substantially wedge-shaped. It is preferred that the first insert member and the second insert member are substantially wedge-shaped. A wedge-shaped insert typically has a substantially triangular cross section, when sectioned normally to the longitudinal or spanwise extension. Preferably, the wedge-shaped insert is arranged such that a side is arranged substantially flush with the upper surface of the stacked arrangement. Preferably, when arranged in the spar cap mould, the profile of the wedge-shaped insert tapers from the upper surface of the stacked arrangement towards the bottom surface of the stacked arrangement.

In a preferred embodiment, the first insert member and/or the second insert member are made of a swellable material. In a preferred embodiment, the first insert member and/or the second insert member comprise balsa wood, a foam material or honeycomb. In a preferred embodiment, the first insert member and/or the second insert member are made of a foam material, preferably polyethylene terephthalate (PET) foam.

In a preferred embodiment, the insert member has a triangular cross section or a trapezoid cross section. In a preferred embodiment, the inserts extend along substantially the entire length (Ls) of the spar cap.

It is preferred that the spar cap of the present invention comprises a plurality of plates of pultruded fibre material, extending generally in a longitudinal/spanwise direction of the spar cap. The pultruded fibre plates of the spar cap preferably have a length of at least 30 meters, such as at least 40 meters, or at least 50 meters. In some embodiments, each plate contains a carbon fibre material. In other embodiments, each plate contains a glass fibre material. In other embodiments, each plate contains a glass fibre material and a carbon fibre material. In some embodiments, the plates may not contain any polymer when laying up the plates in the spar cap mould.

In another aspect, the present invention relates to a wind turbine blade comprising a fibre-reinforced spar cap according to the present invention.

In another aspect, the present invention relates to a mould assembly for manufacturing a fibre-reinforced spar cap for a wind turbine blade, the mould assembly comprising a spar cap mould, a first guide member comprising an upstand and a second guide member comprising an upstand, the first and second guide members being fastened to the mould for providing a moulding cavity in between the first and second guide members, a first insert member for insertion into the moulding cavity, and optionally a second wedge-shape insert for insertion into the moulding cavity. The mould, the first and second guide members and the first and second insert members may have the same properties as discussed in the above-recited embodiments and examples.

In another aspect, the present invention relates to a spar cap assembly comprising a spar cap and at least one wedge-shaped insert, such as a foam or balsa wood insert, attached to the spar cap. In some embodiments, the spar cap comprises an ear of a lightning protection system.

All features and embodiments discussed above with respect to the method of manufacturing a fibre-reinforced spar cap of the present invention likewise apply to the fibre-reinforced spar cap, to the wind turbine blade, and to the spar cap assembly of the present invention, and vice versa.

As used herein, the term "spanwise" is used to describe the orientation of a measurement or element along the blade from its root end to its tip end. In some embodiments, spanwise is the direction along the longitudinal axis and longitudinal extent of the wind turbine blade.

As used herein, the term "longitudinal" generally means a direction running parallel to the maximum linear dimension, typically the longitudinal axis, of, for example the spar cap or the spar cap mould. The longitudinal direction of the spar cap usually coincides with the spanwise direction of the blade, when the spar cap is arranged within the blade.

BRIEF DESCRIPTION OF THE FIGURES

The invention is explained in detail below with reference to an embodiment shown in the drawings, in which.

DETAILED DESCRIPTION OF THE FIGURES

Figure 1:
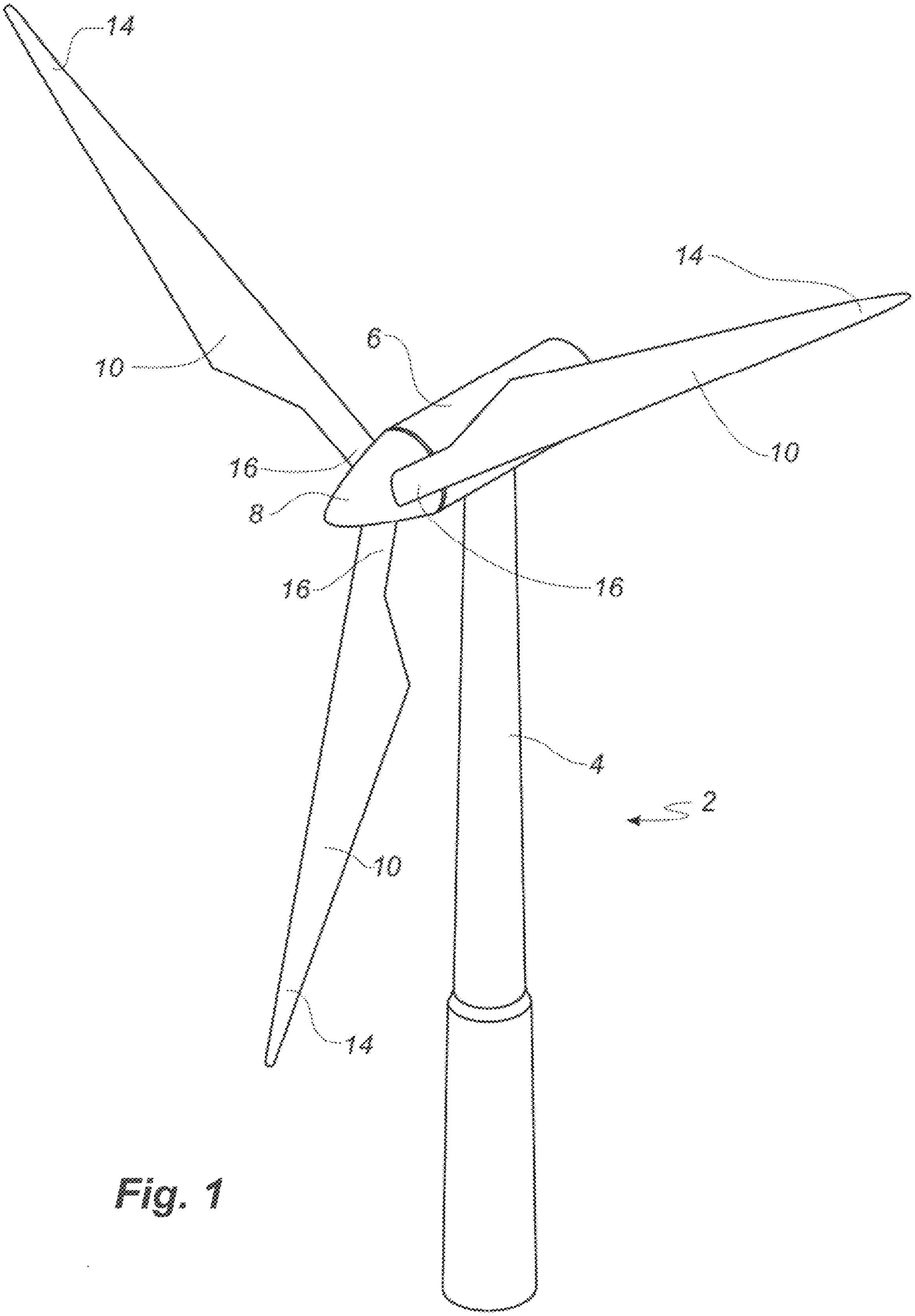
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
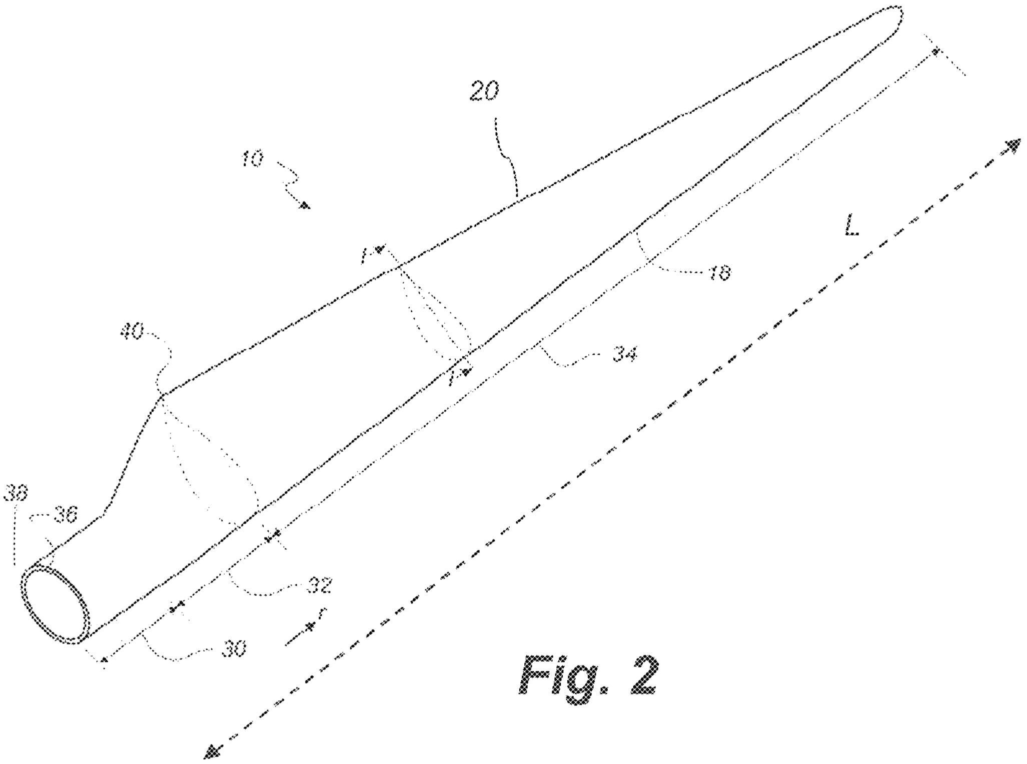
FIG. 2 shows a schematic view of a wind turbine blade.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34. FIG. 2 also illustrates the longitudinal extent L, length or longitudinal axis of the blade.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

Figure 3:
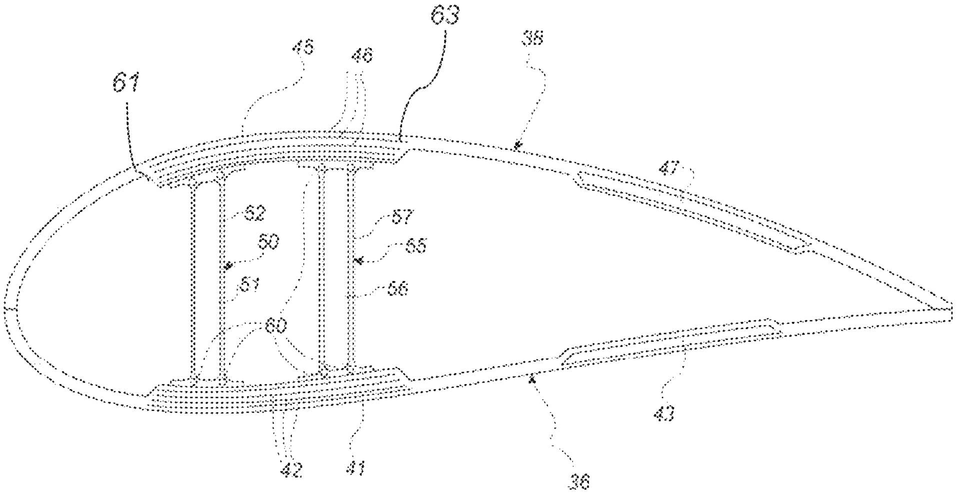
FIG. 3 shows a schematic view of a cross-section of a wind turbine blade.

FIG. 3 shows a schematic view of a cross section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The spar cap 45 has a leading edge side 61 which is closer to the leading edge than the opposing trailing edge side 63 of the spar cap 45. The pressure side shell part 36 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The blade shells 36, 38 may comprise further fibre-reinforcement at the leading edge and the trailing edge. Typically, the shell parts 36, 38 are bonded to each other via glue flanges.

Figure 4:
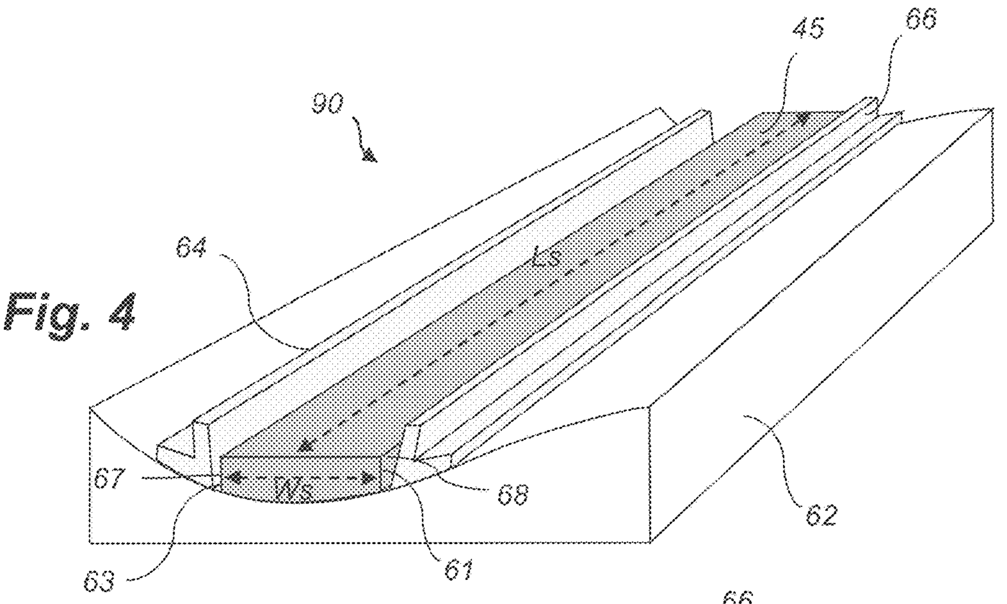
FIG. 4 is a schematic perspective drawing of a moulding assembly for forming a spar cap for a wind turbine blade.

FIG. 4 is a schematic perspective drawing of a moulding assembly for forming a spar cap 45 for a wind turbine blade. A first guide member 64 and a second guide member 66, each having a substantially L-shaped cross section, are fastened to the moulding surface 90 of a mould 62. This can advantageously be done by using bolts. The guide members 64, 66 comprise respective upstands forming respective longitudinally extending guide surface. Thus, a moulding cavity is provided in between the first and second guide members 64, 66. The guide surface of the first guide member diverges from the guide surface of the second guide member in an upward direction. A spar cap 45 can be formed in the moulding cavity. The length Ls and the width Ws of the spar cap are illustrated in FIG. 4. In the final blade the length Ls of the spar cap extends in a substantially spanwise direction.

Figure 5:
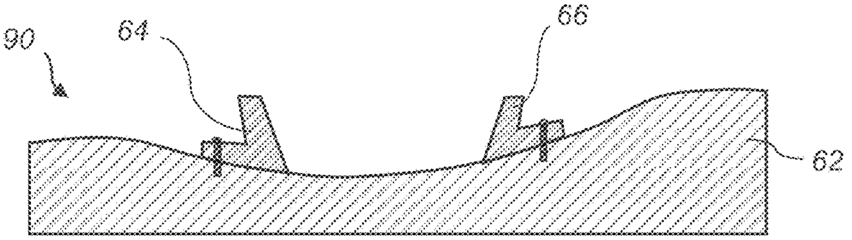
FIGS. 5, 6 and 7 are cross sectional views of a moulding assembly for manufacturing a spar cap according to the present invention.
Figure 6:
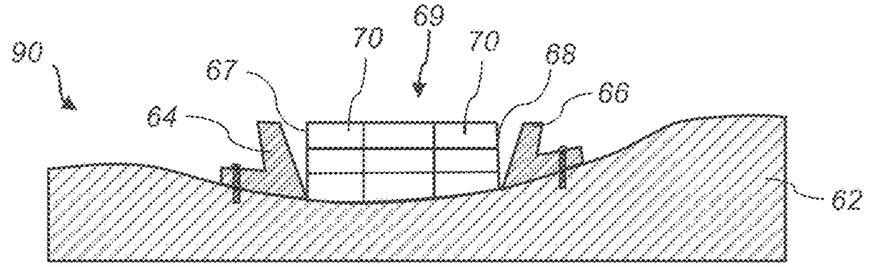
Figure 7:
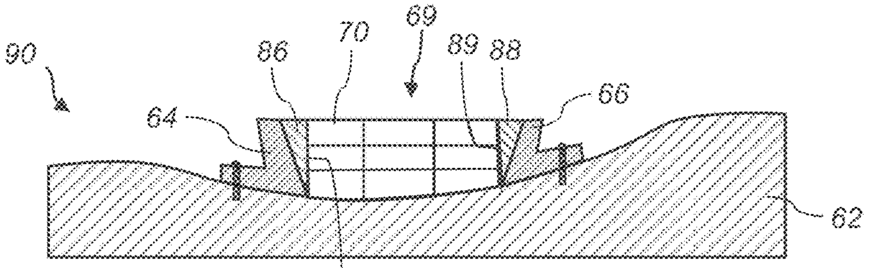

FIGS. 5, 6 and 7 are cross sectional views of a moulding assembly 90 for manufacturing a spar cap according to the present invention, illustrating a sequence of steps of the method of the present invention. The moulding assembly comprises the spar cap mould 62 and first and second guide members 64, 66 fastened to the mould for providing a moulding cavity in between the first and second guide members 64, 66. As indicated in the cross-sectional views, the guide members can be fastened to the mould by bolts, however, other fastening methods can also be used. Also, the moulding cavity can also be provided by other means aside from guide members.

As seen in FIG. 6, a plurality of pultruded fibre plates 70 are arranged in the spar cap mould 62 to form a stacked arrangement 69 of pultruded fibre plates 70. Each pultruded fibre plate is formed in a pultrusion process using a pultrusion fibre material comprising a fibre material such as carbon fibres, and a resin or binding agent. The stacked arrangement is formed from three adjacent stacks of plates 70 in the illustrated embodiment. The stacked arrangement 69 comprises a first lateral surface 67 and an opposing second lateral surface 68.

As seen in FIG. 7, a first wedge-shaped insert member 86 is arranged next to the first lateral surface 67 of the stacked arrangement 69, wherein the first insert member 86 comprises a connecting surface 87 which abuts against the first lateral surface 67 of the stacked arrangement 69. Similarly, a second wedge-shaped insert member 88 is arranged next to the second lateral surface 68 of the stacked arrangement 69, wherein the second insert member 88 comprises a connecting surface 89, and wherein the second insert member 88 is arranged such that its connecting surface 89 abuts against the second lateral surface 68 of the stacked arrangement 69.

Figure 18:
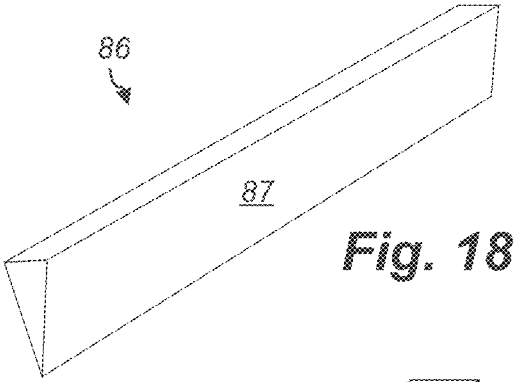
FIGS. 18 and 19 are perspective views of insert members according to the present invention.

The first insert member 86 and the second insert member 88 are preferably made of a swellable material, such as a foam material, e.g. PET foam. A perspective view of the wedge-shaped insert member 86 is shown in FIG. 18, which also illustrates the substantially flat connecting surface of the insert member 86.

Then, a vacuum foil can be placed over the stacked arrangement 69 and the first insert member 86 and the optional second insert member 88 (not shown in FIG. 7). Resin is infused resin into the stacked arrangement 69 and the first insert member 86 and the second insert member 88. The resin is cured the resin to join the stacked arrangement 69 and the first insert member 86 and the second insert member 88 to form the fibre-reinforced spar cap 45.

Figure 8:
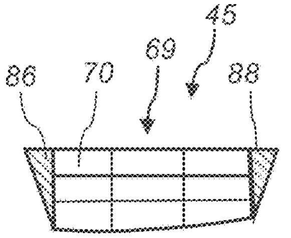
FIGS. 8 and 9 are cross sectional views of spar caps according to the present invention.
Figure 9:
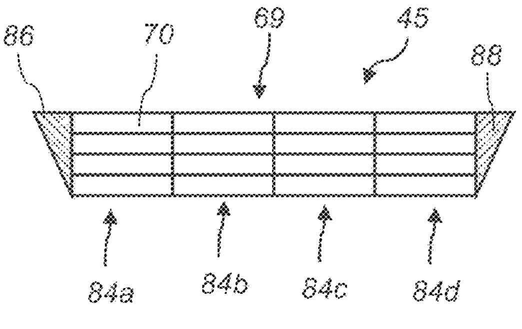

The final spar cap 45 is illustrated in the cross-sectional view of FIG. 8. In this embodiment, the insert members 86, 88 have become a structural part of the spar cap 45. An alternative embodiment is shown in FIG. 9, having a total of four stacks 84*a-d*, each comprising four stacked plates 70, to form the stacked arrangement 69.

Figure 10:
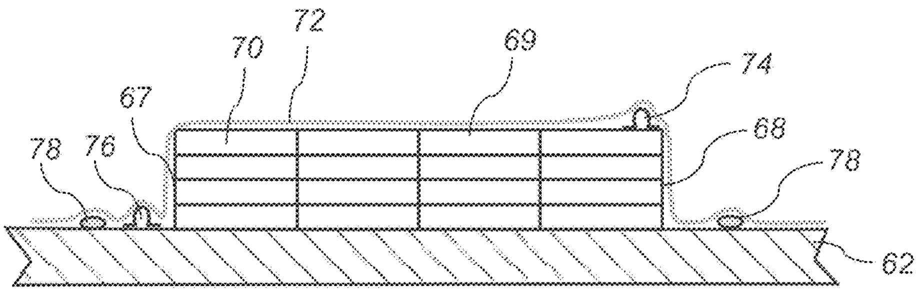
FIGS. 10 and 11 are cross sectional view of a moulding system illustrating a known manufacturing method for spar caps.
Figure 11:
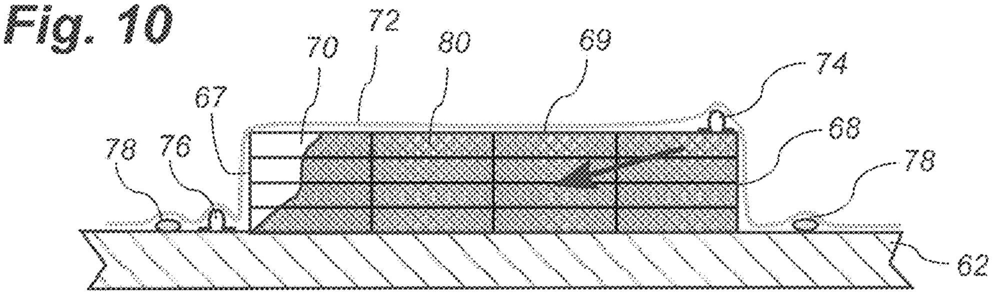

FIGS. 10 and 11 illustrate a known process for forming a spar cap, and the shortcomings thereof. As seen in FIG. 10, a spar cap mould 62 is provided, upon which a stacked arrangement 69 of pultruded fibre plates 70 is arranged. A resin inlet 74 is arranged on top of the stacked arrangement 69 close to the second lateral surface 68 thereof. A vacuum spiral is placed next to the stacked arrangement 69 close to the first lateral surface 67. Thus, the resin flow direction is generally from right to left, i.e. from the second to the first lateral surface 67, as indicated by the arrow in FIG. 11. Preferably, the second lateral surface 68 forms the later leading edge end of the spar cap, and the first lateral surface 67 forms the later trailing edge end of the spar cap.

A vacuum foil is arranged above the stacked arrangement 69, and tape sealant 78 keeps the vacuum foil 72 in place. Resin 80 is infused into the fibre material, as indicated by the darker regions of FIG. 11. A resin flow front is seen within the stacked arrangement 69, close to the first lateral surface. As illustrated in FIG. 11, there are regions which are insufficiently wetted by the resin, which leads to an inferior product.

Figure 12:
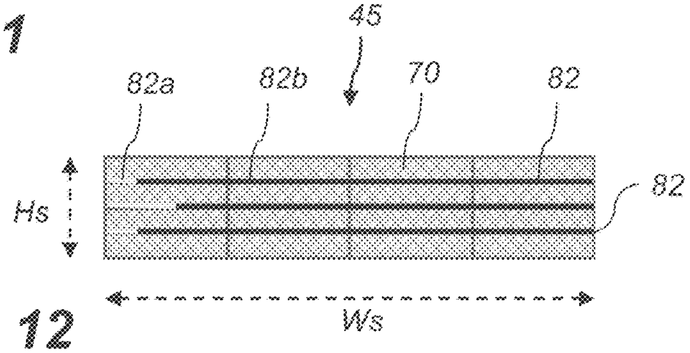
FIG. 12 is a cross sectional view of spar cap produced according to a known manufacturing method.

Another problem arises when horizontal interlayers 82 are used, as shown in the cross section of FIG. 12. Typically, interlayer 82 has a different permeability than the pultruded fibre plates. This leads to challenges in matching the resin impregnation of the fibre plates with the resin impregnation of the interlayers 82. As illustrated in FIG. 12, this may lead to a spar cap in which part of interlayer comprises dry regions **82*a*, as opposed to sufficiently wetted regions 82*b***, which again leads to an inferior end product.

Figure 13:
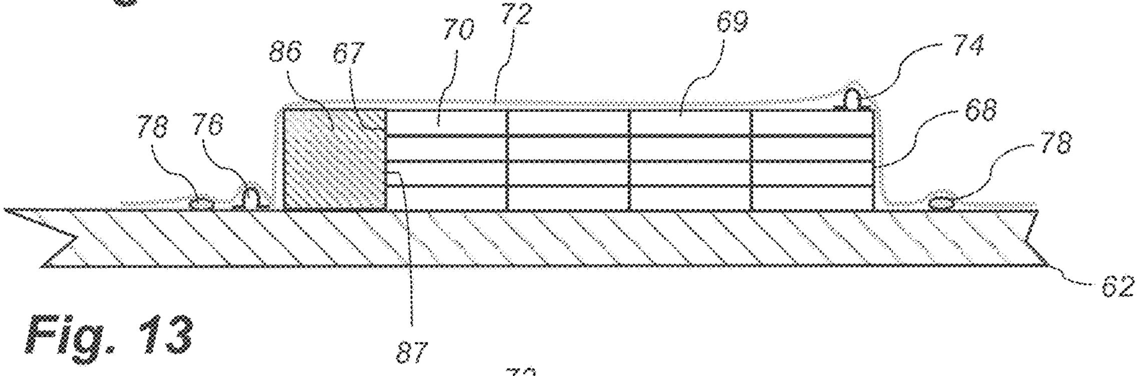
FIGS. 13 and 14 are cross sectional views illustrating a method for manufacturing spar caps according to the present invention.
Figure 14:
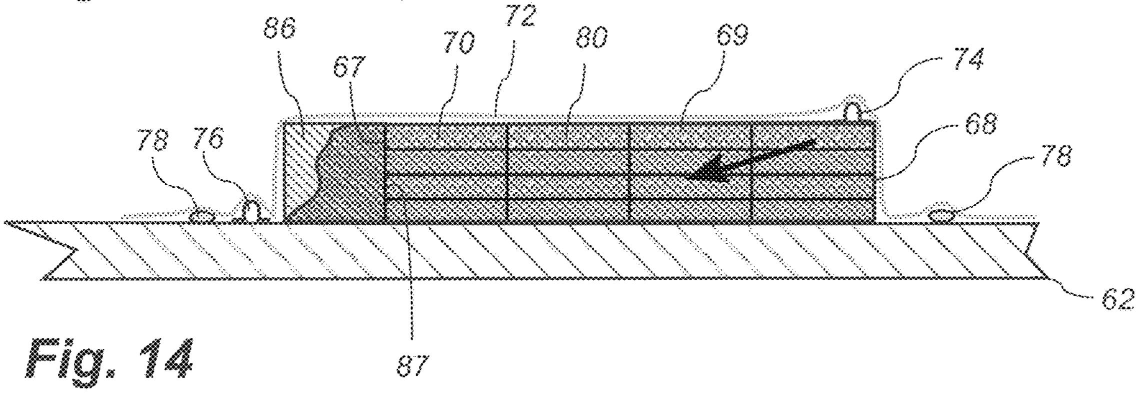

This problem is addressed by the method of the present invention as illustrated in FIGS. 13 and 14, which are cross sectional views illustrating the method for manufacturing spar caps according to the present invention. Here, a cuboid-shaped insert member 86 is arranged next to the first lateral surface 67 of the stacked arrangement 69, wherein the first insert member 86 is arranged such that its connecting surface 87 abuts against the first lateral surface 67 of the stacked arrangement 69. The insert member 86 has the same height as the stacked arrangement 69 of pultruded fibre plates 70.

Figure 19:
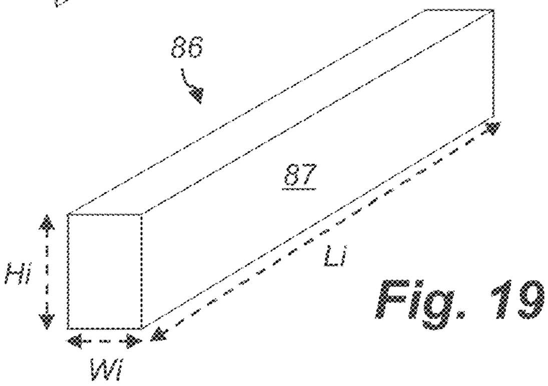

FIG. 19 illustrates a perspective view of the cuboid-shaped insert member 86 and its substantially flat connecting surface 87. FIG. 19 also illustrates the length Li, the width Wi, and the height Hi of the insert member. Typically, the length Li of the insert member extends in parallel to the length of the spar cap, i.e. in a substantially spanwise direction in the later blade. As seen in FIG. 18, the width Wi of the insert member may taper from its upper surface towards its bottom surface. This is found to facilitate demoulding of the fibre-reinforced spar cap or the preform thereof, after the resin curing step.

Figure 15:
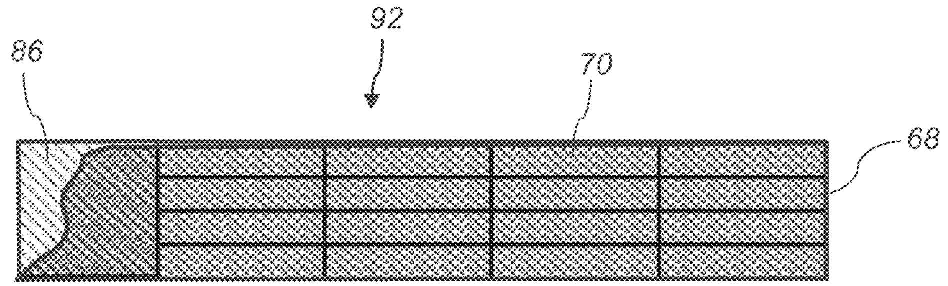
FIG. 15 is a cross sectional view of a preform of a spar cap according to the present invention.
Figure 16:
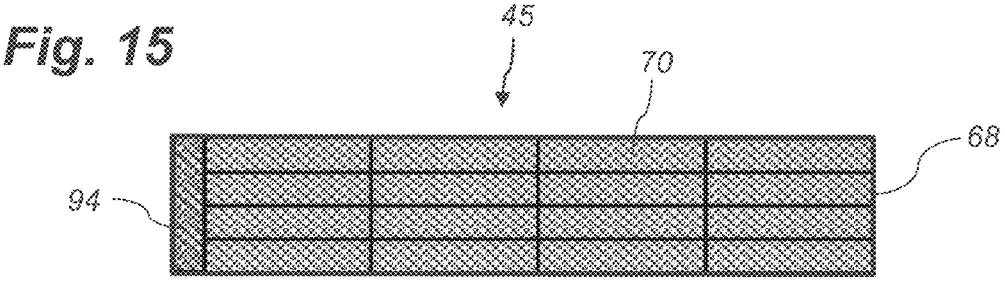
FIGS. 16 and 17 are cross sectional views of respective spar caps according to the present invention.
Figure 17:
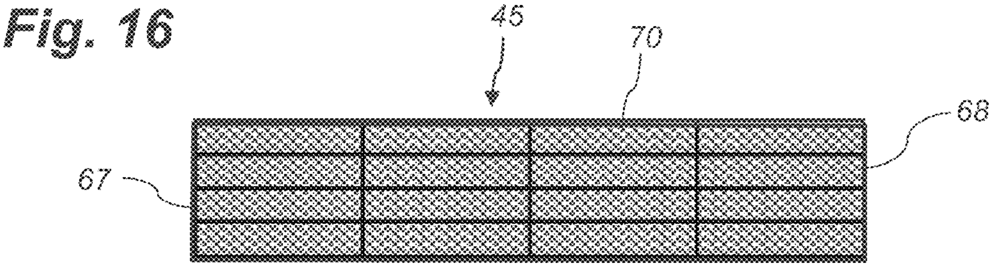

As seen in FIG. 14, the region of insufficient resin wetting is now moved into the insert member 87. A cross section of the demoulded preform 92 of the spar cap is illustrated in FIG. 15. After demoulding, part of the resin-infused insert member can be removed, e.g. by cutting or trimming, resulting in the final spar cap as illustrated in FIG. 16. Here, the entire spar cap is uniformly infused by resin, leading to an improved structural quality of the final product. In the embodiment illustrated in FIG. 17, the entire insert member 87 has been removed for forming the final spar cap.

Figure 20:
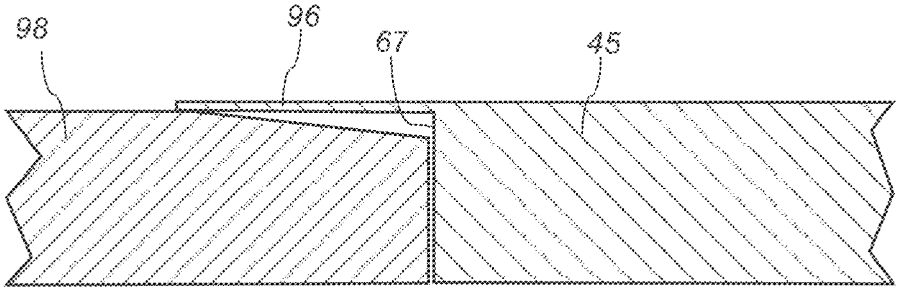
FIGS. 20 and 21 are cross sectional views of a spar cap assembly according to the present invention.
Figure 21:
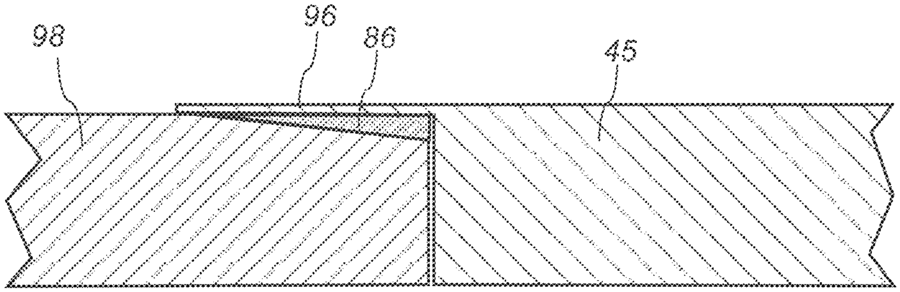

FIGS. 20 and 21 are cross sectional views of a spar cap assembly according to the present invention. Here, the spar cap comprises an ear of a lightning protection system. When arranging the spar cap 45 in the blade mould for forming the wind turbine blade mould, typically a core material 98, such as a foam or balsa wood, is arranged next to the spar cap 45 as seen in the chordwise direction. Typically, the core material is smoothed out at its edge to remove any hard points where the mesh material of the lightning protection system by bend or break under vacuum. However, this operation usually results in the formation of a gap underneath the ear 96, as seen in FIG. 20. According to the present invention, this gap can be filled with a wedge-shaped insert member 86 according to the present invention, prior to resin infusion in the blade mould.

The invention is not limited to the embodiments described herein and may be modified or adapted without departing from the scope of the present invention.

LIST OF REFERENCE NUMERALS

4 tower
6 nacelle
8 hub
10 blades
14 blade tip
16 blade root
18 leading edge
20 trailing edge
30 root region
32 transition region
34 airfoil region
36 pressure side shell part
38 suction side shell part
40 shoulder
41 spar cap
42 fibre layers
43 sandwich core material
45 spar cap
46 fibre layers
47 sandwich core material
50 first shear web
51 core member
52 skin layers
55 second shear web
56 sandwich core material of second shear web
57 skin layers of second shear web
60 filler ropes
61 leading edge side of spar cap
62 mould
63 trailing edge side of spar cap
64 first guide member
66 second guide member
67 first lateral surface
68 second lateral surface
69 stacked arrangement
70 pultruded fibre plates
72 vacuum foil
74 inlet profile
76 vacuum spiral
78 tape sealant
80 resin
82 interlayer
84 stack of pultruded fibre plates
86 first insert member
87 connecting surface of first insert member
88 second insert member
89 connecting surface of second insert member
90 moulding assembly
92 preform of spar cap
94 trimmed insert member
96 LPS ear 98 core material
L length of blade
Li length of insert
Ls length of spar cap
Hi height of insert
Hs height of spar cap
Wi width of insert
Ws width of spar cap
r distance from hub
R rotor radius

The invention claimed is:

1. A method of manufacturing a fibre-reinforced spar cap for a wind turbine blade, the method comprising:
- providing a spar cap mould;
- arranging a plurality of pultruded fibre plates in the spar cap mould to form a stacked arrangement of pultruded fibre plates, wherein the stacked arrangement comprises a first lateral surface and an opposing second lateral surface;
- arranging a first insert member next to the first lateral surface of the stacked arrangement, wherein the first insert member comprises a connecting surface, and wherein the first insert member is arranged such that the connecting surface of the first insert member abuts against the first lateral surface of the stacked arrangement;
- optionally arranging a second insert member next to the second lateral surface of the stacked arrangement, wherein the second insert member comprises a connecting surface, and wherein the second insert member is arranged such that the connecting surface of the second insert member abuts against the second lateral surface of the stacked arrangement;
- placing a vacuum foil over the stacked arrangement and the first insert member and the optional second insert member;
- infusing resin into the stacked arrangement and the first insert member and the optional second insert member;
- curing the resin to join the stacked arrangement and the first insert member and the optional second insert member to form the fibre-reinforced spar cap or a preform thereof;
- removing the vacuum foil;
- demoulding the fibre-reinforced spar cap or the preform thereof from the spar cap mould; and
- trimming or grinding at least part of the first insert member and/or at least part of the optional second insert member of the preform to form the fibre-reinforced spar cap after curing the resin.

2. The method according to claim 1, further comprising infusing the resin such that a resin flow direction is generally from the second lateral surface towards the first lateral surface of the stacked arrangement.

3. The method according to claim 1, wherein the first insert member has the same height as the stacked arrangement of pultruded fibre plates.

4. The method according to claim 1, wherein the first insert member is cuboid shaped.

5. The method according to claim 1, wherein at least one of the first insert member or the optional second insert member is substantially wedge-shaped.

6. The method according to claim 5, wherein a profile of at least one of the first insert member or the optional second insert member being wedge-shaped tapers from an upper surface of the stacked arrangement towards a bottom surface of the stacked arrangement.

7. The method according to claim 1, wherein at least one of the first insert member or the optional second insert member is made of a swellable material.

8. The method according to claim 1, wherein at least one of the first insert member or the optional second insert member comprises at least one of balsa wood, a foam material, or honeycomb.

9. The method according to claim 8, wherein at least one of the first insert member or the optional second insert member is made of the foam material, the foam material comprising polyethylene terephthalate (PET) foam.

10. The method according to claim 1, further comprising disposing an interlayer between adjacent pultruded fibre plates in the stacked arrangement of pultruded fibre plates.

11. The method according to claim 1, further comprising:
- providing a wind turbine shell part with an outer aerodynamic surface and an opposing inner surface;
- arranging the fibre-reinforced spar cap on the inner surface of the shell part; and
- bonding the fibre-reinforced spar cap to the inner surface of the shell part.

12. A fibre-reinforced spar cap for a wind turbine blade, the spar cap (45) comprising;
- a plurality of pultruded fibre plates formed into a stacked arrangement of pultruded fibre plates, wherein the stacked arrangement comprises a first lateral surface and an opposing second lateral surface (68);
- a first insert member arranged next to the first lateral surface of the stacked arrangement, wherein the first insert member comprises a connecting surface, and wherein the first insert member is arranged such that the connecting surface of the first insert member abuts against the first lateral surface of the stacked arrangement; and
- optionally a second insert member arranged next to the second lateral surface of the stacked arrangement, wherein the second insert member comprises a connecting surface, and wherein the second insert member is arranged such that the connecting surface of the second insert member abuts against the second lateral surface of the stacked arrangement;
- wherein the first insert member, and optionally the second insert member, are bonded to the stacked arrangement of pultruded fibre plates by a cured resin; and
- wherein at least one of the first insert member, or optionally the second insert member, is trimmed or ground after being bonded together by the cured resin to form a trimmed insert member that forms at least a portion of an outer surface of the fibre-reinforced spar cap.

13. The fibre-reinforced spar cap according to claim 12, wherein at least one of the first insert member or the second insert member is a ground or trimmed insert member.

14. The fibre-reinforced spar cap according to claim 12, wherein at least one of the first insert member or the second insert member is substantially wedge-shaped.

15. The fibre-reinforced spar cap according to claim 12, wherein a profile of at least one of the first insert member or the second insert member being wedge-shaped tapers from an upper surface of the stacked arrangement towards a bottom surface of the stacked arrangement.

16. The fibre-reinforced spar cap according to claim 12, wherein at least one of the first insert member or the second insert member is made of a swellable material.

17. The fibre-reinforced spar cap according to claim 12, wherein at least one of the first insert member or the second insert member comprises at least one of balsa wood, a foam material, or honeycomb.

18. The wind turbine blade comprising the fibre-reinforced spar cap according to claim 12.

* * * * *